May 19, 1953

G. M. MOTIS 2,638,604

ARTIFICIAL ARM WITH STEPPED-UP WRIST DRIVE AND AUTOMATIC WRIST LOCK

Filed July 14, 1951

GILBERT M. MOTIS,
INVENTOR.

BY *Forrest J. Lilly*

ATTORNEY.

May 19, 1953  G. M. MOTIS  2,638,604
ARTIFICIAL ARM WITH STEPPED-UP WRIST
DRIVE AND AUTOMATIC WRIST LOCK
Filed July 14, 1951  3 Sheets-Sheet 2
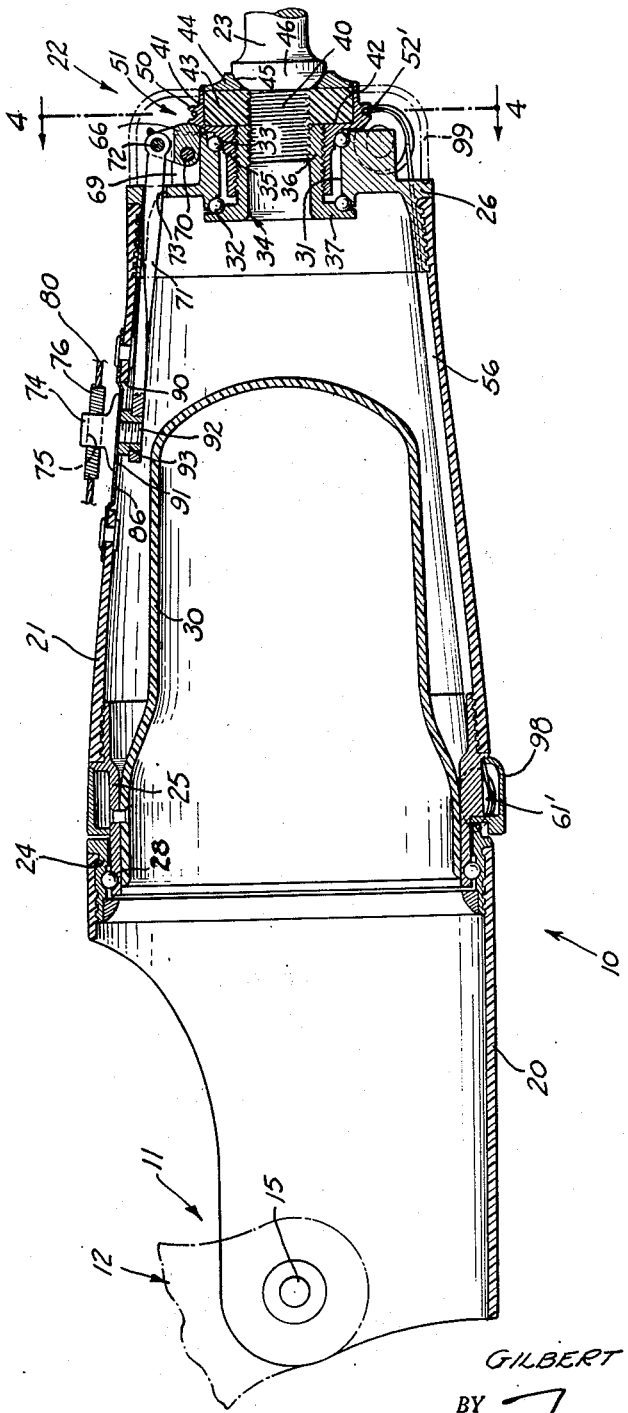
FIG. 3.
INVENTOR.
GILBERT M. MOTIS.
BY
ATTORNEY.

GILBERT M. MOTIS,
INVENTOR.

BY Forrest J. Lilly
ATTORNEY.

Patented May 19, 1953

2,638,604

UNITED STATES PATENT OFFICE 2,638,604

ARTIFICIAL ARM WITH STEPPED-UP WRIST DRIVE AND AUTOMATIC WRIST LOCK

Gilbert M. Motis, Northridge, Calif., assignor to Northrop Aircraft, Inc., Hawthorne, Calif., a corporation of California Application July 14, 1951, Serial No. 236,787

12 Claims. (Cl. 3—12.5)

The present invention relates generally to artificial arms, and is more particularly concerned with below-elbow arms of the type wherein the hook or hand is rotatable and can be pronated and supinated by the forearm stump.

In artificial arms of this type, it is desirable to provide for some step-up of the rotational movement transmitted from the stump to the hook, owing to the fact that the pronation-supination movement of the stump is inversely proportional to its length, and is usually not sufficient to manipulate the hook to best advantage. One of the objects of the invention, therefore, is to provide a new and improved mechanism for rotating the wrist member from the stump with a stepped-up rate of movement.

Another important object of the invention is to provide an artificial arm of the class described, wherein the wrist is locked automatically when the hook or hand is operated. The advantage of this feature is that it prevents the feed back of torsional loads from the hook or hand to the stump socket, thereby eliminating any tendency of the stump socket to twist on the stump, with attendant discomfort to the amputee. Such torsional loads may be due to the pull of the control cable on the hook at a point spaced radially outward from the axis of rotation of the wrist, as in the case of external control hooks, or they may be due to supporting an off-center load with the hook. In either case, the present invention eliminates such feed-back of torsional loads by the provision of means for locking the wrist automatically before the hook or hand is operated, and before any appreciable torsional load can be developed therein.

Another object of the invention is to provide a novel mechanism for artificial arms, wherein the lock for locking the wrist unit against rotation is operated by the same control member that is used to operate the hook or hand. The advantage of this arrangement is that it eliminates the need for utilizing another of the amputee's limited supply of control movements to operate the wrist lock, and thus makes another control movement available to perform some other useful function. One of the features of the invention is that the force required to operate the lock is substantially less than the force required to operate the hook, and therefore the lock can be locked without actually opening the hook.

Still a further object of the invention is to provide an artificial arm with rotatable wrist for below-elbow amputees that is so constructed and arranged as to make possible a more compact wrist unit and smaller-sized forearm than has heretofore been obtainable. This has the dual advantage of providing an arm capable of accommodating the longest forearm stump short of wrist disarticulation, and at the same time providing an arm more nearly approximating the dimensions and proportions of the natural arm.

These objects are realized by providing a forearm member made up of a stationary rear shell and a rotatable outer shell; while mounted on the distal end of the latter is the wrist unit carrying the hook or hand. The rotatable outer shell is rigidly attached to the stump socket, so that the two rotate as a single unit. A pair of lines are attached to the wrist unit at circumferentially spaced points thereon and pass around two adjacent pulleys on the rotatable outer shell, then extend back up the arm and around another two pulleys to circumferentially spaced points of attachment with the stationary rear shell.

The diameter of the stationary rear shell is approximately twice the diameter of the wrist unit, and therefore rotation of the outer shell with respect to the stationary shell causes the lines to be paid out and taken up at the upper end at twice the rate they are taken up and paid out, respectively, at the lower end. As a result, the wrist unit is turned on the rotatable outer shell through an angular distance equal to twice the angular travel of the outer shell relative to the stationary upper shell. The net result is a 3:1 step-up of the rotational movement transmitted from the stump socket to the wrist unit.

To lock the wrist unit against rotation, a locking member is pivoted on the rotatable outer shell and is engageable with teeth on the wrist unit. The locking member is normally spring-held out of engagement with the said teeth, and is pulled into locking engagement by a sliding operator on the outer forearm shell. The flexible conduit housing of the Bowden cable control member that operates the hook or hand is attached at its lower end to the sliding operator, and the reaction force on the housing when a control force is applied to the cable, causes the operator to slide in the direction to lock the wrist. The force required to overcome friction and the spring-pressure acting on the locking member, is substantially less than the force required to open the hook, and therefore the wrist is locked before the hook is opened.

The foregoing and other objects and advantages of the present invention will become apparent to those skilled in the art upon consideration of the following detailed description of the preferred embodiment thereof, reference being had to the accompanying drawings, wherein:

Figure 3 is a longitudinal sectional view, taken along the line 3—3 in Figure 1, showing the wrist lock in the locked condition;

Figure 1:
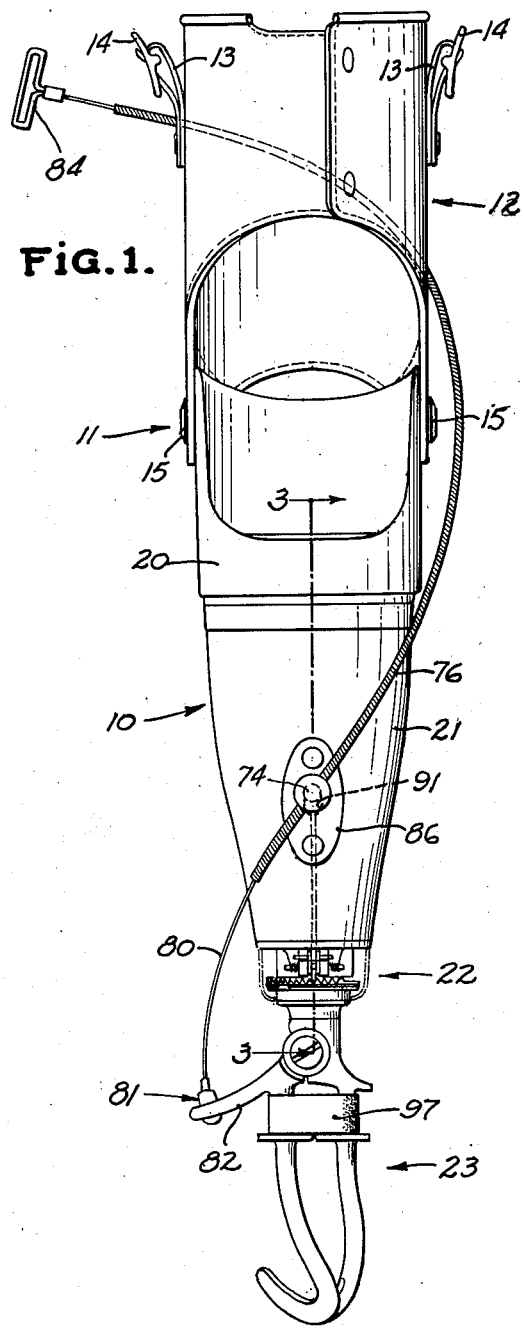
Figure 1 is a top plan view of an arm embodying the principles of my invention.

As brought out earlier in this specification, the arm of the present invention is for the below-elbow amputee whose stump has sufficient length and mobility about the pronation-supination axis to permit of its use in the function of pronating and supinating the hand or hook. Accordingly, the arm is comprised of a forearm member 10, which is connected by an elbow joint 11 to a leather cuff 12 that is fastened around the upper arm of the amputee. Strap loops 13 and buckles 14 are provided on opposite sides of the cuff 12 for attachment to a suitable shoulder harness (not shown) which serves to hold the artificial arm in place. The elbow joint 11 is of the conventional type for below-elbow arms, and is made up of two laterally spaced hinge connections 15, which are normally disposed on opposite sides of the natural elbow and coaxial therewith. The forearm member 10 is seen to comprise a stationary rear shell 20, on which is mounted a rotatable outer shell 21, and carried by the latter is a wrist unit 22 to which a terminal device, such as a hook 23 or hand, is attached.

Both the rear shell 20 and outer shell 21 are preferably formed by laminating several layers of plastic-impregnated cotton stockinet over plaster forms of the desired shape, and then curing or polymerizing the resin in an oven to produce an extremely strong, durable, and lightweight structure. In the process of fabricating the shells 20 and 21, various metal fittings such as the components of the elbow hinge connection 15, as well as an outer ball race 24, cooperating inner race 25, and wrist unit body member 26 are embedded in the plastic laminate and become permanently bonded thereto. Balls 28 run in the races 24, 25, and provide a frictionless bearing for rotatably supporting the outer shell 21 on the rear shell 20.

Riveted or otherwise fixed to the inside surface of the inner race 25 is a stump socket 30, which is also preferably formed by laminating plastic-impregnated cotton stockinet over a plaster model of the stump, and then curing the same to provide an accurately formed socket that is exactly shaped to receive the stump. The stump socket 30 is thus attached to the outer shell 21 and is therefore rotatable therewith, and it is by the rotation of the outer shell 21 relative to the stationary rear shell 20 that the stepped-up rotation of the wrist member 22 is effected.

The wrist unit body member 26 has a cylindrical opening 31 provided in the center thereof, and at each end of the opening are circumferential grooves that form the outer raceways for two rows of ball bearings 32 and 33. The inner raceways for the balls 32, 33 are formed in two cooperating members 34 and 35, which are screwthreaded together to make up the rotatable portion of the wrist unit. The member 34 consists of a tubular body 36 with a radial flange 37 at the back end thereof; the inner surface of the body portion 36 being threaded for a portion of its length to receive the screwthreaded shank 40 of the hook or hand 23.

Figure 5:
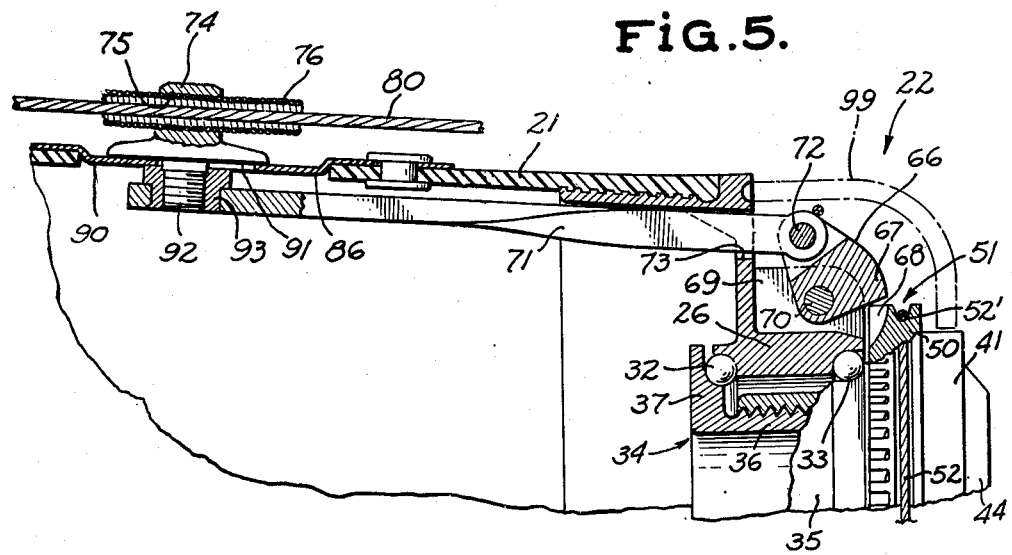
Figure 5 is an enlarged fragmentary view of the wrist lock mechanism shown in Figure 3, with the locking device depicted in the unlocked condition.

The right hand end of the member 35, as seen in Figures 3 and 5, is enlarged in diameter and provided with a radial flange 41, forming a cup-like cavity 42 that receives a rubber washer 43. The washer 43 is engaged on its outer face and compressed against the bottom of the cavity 42 by a metal ring 44 having a spherically curved, annular seat 45 that receives a correspondingly curved, annular enlargement 46 on the stem of the hook 23. This arrangement permits the ring 44 to be drawn up tightly against the washer 43 without turning relative thereto when the hook is screwed into the threaded portion of member 36. The compression of the rubber washer 43 takes up any clearance between the threads of the stem 40 and member 36, and makes for a tight connection between the hook and the wrist unit.

Projecting radially outward from the flange 41 around the circumference thereof is an annular ridge 50 having a pulley groove 51 formed therein. Two cords 52 and 52' are trained in opposite directions through the pulley groove 51 from the bottom side thereof, and the ends of the cords are attached to the inner raceway 35 in any suitable manner. The two cords 52, 52' pass around and extend rearwardly from two pulleys 53, 53' (Figure 4) that are journalled on opposite sides of a boss 54 projecting downwardly from the bottom of the wrist unit body member 26. The two cords pass through holes 55 (Figure 4) in the end of the member 26 and extend back along the arm through a cable housing 56 on the interior of the shell 21.

At the back end of the shell 21, the cords emerge through holes 60 and pass in opposite directions around two laterally spaced pulleys 61, 61' that are journalled on the bottom side of the inner race member 25. After passing around the pulleys 61, 61', the two cords 52, 52' extend circumferentially around the arm in opposite directions to points of attachment 62 and 62' with the stationary rear shell 20; the latter being cut out and provided with a metal insert 63 for the purpose.

Figure 2:
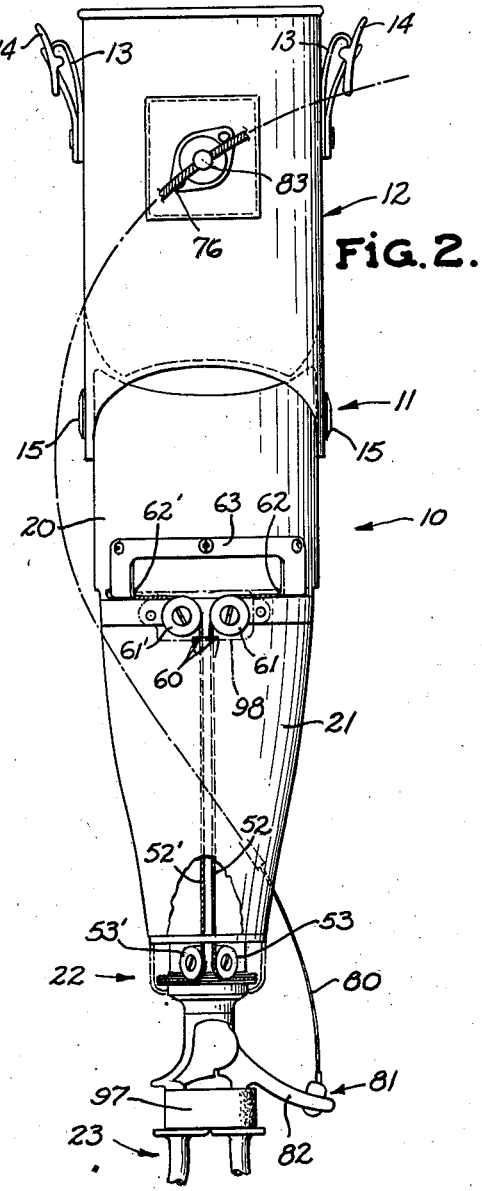
Figure 2 is a bottom view of the same.

It will be noted in Figure 2 that the diameter of the shell 20 at the point of attachment of cords 52, 52' is approximately twice the diameter of the pulley groove 51, which means that for a given angular increment of rotation of the shell 21 relative to the shell 20, the length of cord taken up over one of the pulleys 61, 61' and payed out over the other will be twice the length payed out and taken up over the corresponding pulleys 53, 53' at the other end of the shell. This pull exerted on one cord and slackening off of the other causes the wrist members 34, 35 to rotate through an angular distance equal to twice the angular travel of the shell 21 relative to the stationary shell 20, i. e., at a 2:1 ratio. Since the inner raceway 34, 35 is mounted on the shell 21, it also turns with the latter, and the step-up ratio is thereby increased to 3:1. Other step-up ratios can be obtained, of course, by varying the relative diametral proportions of the shell 20 and pulley groove 51, although the 3:1 ratio is believed to be the optimum for the majority of cases.

In order to prevent the feedback of torsional loads from the hook or hand to the stump socket, means is provided for automatically locking the wrist against turning when the hook or hand is operated. Such torsional loads may result from the fact that the pull of the control cable is applied to the hook at the end of a moment arm, as in the case of the typical external control hook illustrated, or they may result from lifting loads which are off-center from the axis of rotation of the hook. In either case, the feedback of torsional loads tends to twist the stump socket on the stump, causing much discomfort to the amputee.

The automatic locking means just referred to comprises a pivoted locking dog 66 having a tooth 67 which is engageable with a toothed portion 68 on the back side of the ridge member 58 of part 35. The dog 66 is disposed between two laterally spaced lugs 69 projecting upwardly from the top of the wrist unit body member 26, and is journalled for rocking movement about a pin 70 extending transversely through alined holes in the several parts. The outer end of the dog 66 is slotted to receive one end of a link 71, and the two parts are connected by a pin 72. The link 71 extends rearwardly through a hole 73 in the end of member 26, and its back end is connected to a sliding operator 74.

The operator 74 is in the form of a cable housing anchor and to this end is provided with an internally threaded hole 75 into which a spring-wound Bowden cable housing, or conduit 76, is screw threaded. A flexible tension-transmitting cable 80 passes through the housing 76 and is freely slidable therein; the bottom end of the cable being attached by a fitting 81 to the thumb 82 of the hook. The cable and housing extend around the arm in a long spiral, as shown in Figures 1 and 2, and the housing is attached to the leather cuff 12 by a fixed anchor fitting 83. A terminal fitting 84 is attached to the top end of the cable 80, and this is secured to the usual shoulder harness in the well known manner.

The operator 74 is slidably supported on a plate 86 which is riveted over an opening 90 in the outer shell 21. A slot 91 extending lengthwise of the arm is formed in the plate 86, and a threaded stem 92 of the operator extends down through this slot. A nut 93 is screwed onto the threaded stud 92, and the rear end of link 71 fits over the end of the nut and is secured thereto. The operator 74 is thus free to slide lengthwise of the arm within the limits of the slot 91, and in so doing, rocks the locking dog 66 between the locked position shown in Figure 3 and the unlocked position shown in Figure 5.

Figure 4:
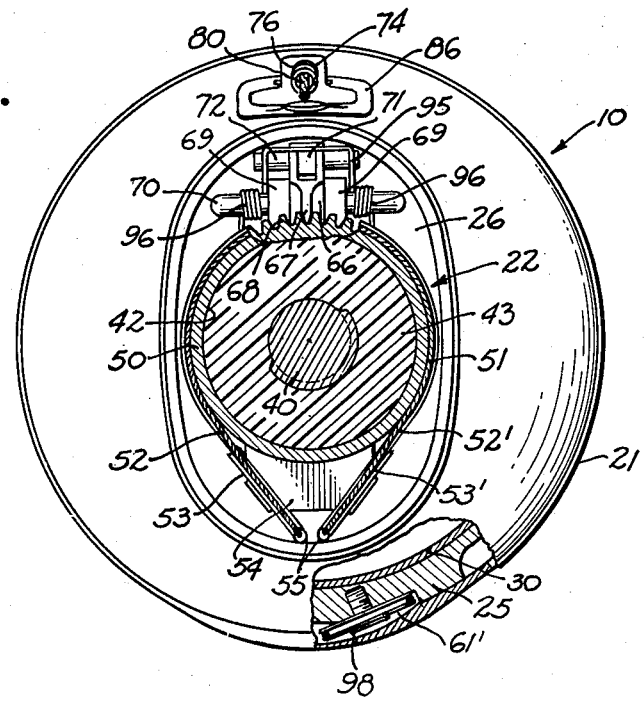
Figure 4 is an enlarged transverse sectional view through the wrist, taken at 4—4 in Figure 3.

The locking dog 66 is urged in clockwise direction (Figure 5) to the unlocked position by means of a wire spring 95, best shown in Figure 4, which engages the pin 72. Coils 96 of the spring are wrapped around pin 71, and the ends of the spring are suitably attached to the wrist unit body member 26.

When a pull is applied to the control cable 80, the latter tends to straighten out, but is constrained against so doing by the anchor fitting 83 and operator 74, which are attached to the cable housing. Fitting 83 is rigidly fixed in position on the cuff 12, and therefore is immovable, but the operator 74 is movable within the limits of the slot 91, and therefore tends to be pushed down to the outer end thereof. As the operator moves outwardly, or to the right, as viewed in Figures 3 and 5, the link 71 swings the locking dog 66 in a clockwise direction against the pressure of spring 95, to the locking position shown in Figure 3. In this position, the tooth 67 is engaged between two of the teeth 68 on the wrist member 35, and the latter is thereby prevented from rotating with respect to the outer shell 21.

The strength of the spring 95 is such that a pull of approximately two pounds on the control cable 80 is required to operate the lock, whereas the tension of the rubber bands 97 on the hook necessitates a minimum pull of at least six pounds to open the hook. This relationship insures that the wrist will be locked before the hook is opened, and also enables the amputee to lock the wrist, even without operating the hook, by merely applying tension on the control cable 80 sufficient to operate the lock, but not enough to open the hook. This gives the hook stability for lifting off-center loads, and prevents any torsional feedback to the stump socket.

Another advantage of the artificial arm of my invention is that the arrangement of one row of ball bearings 28 near the back end of the forearm member permits a reduction in the overall size of the forearm, and also makes possible a shorter wrist unit, so that it can be used on the longest forearm stump short of wrist disarticulation. Another consideration is the pleasing appearance of the arm, which closely follows the shape and size of a natural arm, besides being relatively free from protuberances and sharp edges that cause undue wear of the clothing. In this connection, it will be noted that the pulleys 61, 61' are covered by a cover plate 98 (Figure 2), while the outer, or distal end of the outer shell 21 is covered by a plastic cap 99 that encloses the wrist drive and wrist lock mechanism.

While I have shown and described in considerable detail what I believe to be the preferred form of my invention, it is to be understood that such details are merely illustrative, and that various changes may be made in the shape and arrangement of the several parts, without departing from the broad scope of the invention, as defined in the appended claims.

I claim:

1. In an artificial arm having a forearm member, a stump socket rotatably mounted on said forearm member, a wrist member rotatably mounted on said forearm member, and a terminal device attached to said wrist member, the combination of driving means connecting said stump socket with said wrist member, a locking dog on said forearm member movable into engagement with said wrist member to lock the same against rotation, a control cable operably connected to said terminal device, a housing enclosing said cable, and an operating member slidably mounted on said forearm member and connected to said locking dog, said cable housing being attached to said operating member, and said operating member being operable to move said locking dog into engagement with said wrist member when at one extremity of its travel and to disengage said locking dog therefrom when at the other extremity, said operating member being shifted to said one extremity by the reaction force on said cable housing when a force is applied to the cable so as to lock said wrist when said terminal device is being operated.

2. In an artificial arm having a forearm member, a wrist member rotatably mounted thereon, and a terminal device attached to said wrist member, the combination of a locking member mounted on said forearm member for movement into engagement with said wrist member to lock the same against rotation, a control member operably connected to said terminal device, and an operating member on said forearm member connected to said control member in a manner to be shifted thereby when a force is transmitted to said terminal device, said operating member being connected to said locking member to move the same into engagement with said wrist member, so as to lock said wrist while said terminal device is being operated.

3. In an artificial arm having a forearm member, a wrist member rotatably mounted thereon, and a terminal device attached to said wrist member, the combination of a locking member mounted on said forearm member for movement into engagement with said wrist member to lock the same against rotation, a control cable operably connected to said terminal device, a housing enclosing said cable, and an operating member movably mounted on said forearm member and connected to said locking member to shift the same into engagement with said wrist member when moved in one direction, said cable housing being attached to said operating member, and the latter being moved in said one direction by the reaction force on said cable housing when a force is applied to the cable so as to lock said wrist when said terminal device is being operated.

4. In an artificial arm having a forearm member, a wrist member rotatably mounted thereon, and a terminal device attached to said wrist member, the combination of a locking member mounted on said forearm member for movement into engagement with said wrist member to lock the same against rotation, a control member operably connected to said terminal device, and an operating member movably mounted on said forearm member, said operating member being connected to said locking member to move the same into engagement with said wrist member when shifted in one direction, and said operating member being connected to said control member in a manner to be shifted thereby in said one direction when a force is transmitted by said control member to said terminal device, whereby said wrist is locked while said terminal device is being operated.

5. In an artificial arm having a forearm member, a wrist member rotatably mounted thereon, and a terminal device attached to said wrist member, the combination of a locking member pivoted on said forearm member for rocking movement into and out of engagement with said wrist member to lock the same against rotation, a spring yieldingly urging said locking member out of engagement with said wrist member, a control cable operably connected to said terminal device, a housing enclosing said cable, an operating member slidably mounted on said forearm member and attached to said cable housing, and a link connecting said operating member to said locking member, whereby the latter is rocked into engagement with said wrist member against the pressure of said spring by sliding movement of said operating member in one direction, said operating member being shifted in said one direction by the reaction force on said cable housing when a force is applied to the cable so as to lock said wrist when said terminal device is being operated.

6. In a below-elbow arm, the combination of a stationary forearm shell having an outer shell mounted on the outer end thereof for rotation about the longitudinal axis of the forearm, a stump socket attached to said outer shell and rotatable therewith, a wrist member rotatably mounted on said outer shell coaxial therewith, and a pair of flexible lines carried by said outer shell, said lines being connected at one end to said stationary forearm shell and at the other end to said wrist member in a manner whereby rotation of said outer shell with respect to said stationary shell causes a pull to be exerted on one of said lines, and the pull of said one line causes said wrist member to be rotated in the same direction relative to said outer shell.

7. In a below-elbow arm, the combination of a stationary forearm shell having an outer shell rotatably mounted thereon, a stump socket attached to said outer shell and rotatable therewith, a wrist member rotatably mounted on said outer shell, a pair of flexible lines extending generally lengthwise of said outer shell, a pair of pulleys journaled on said outer shell at the proximal end thereof, and another pair of pulleys journaled on said outer shell at the distal end thereof, the inner ends of said lines passing around said first-named pulleys and extending circumferentially around the arm in opposite directions to points of attachment with said stationary forearm shell, the outer ends of said lines passing around said last-named pulleys and extending in the same directions as their respective inner ends to points of attachment with said wrist member, whereby rotation of said outer shell with respect to said stationary shell causes a pull to be exerted on one of said lines, and the pull of said one line causes said wrist member to be rotated in the same direction relative to said outer shell.

8. A below-elbow artificial arm comprising a stationary forearm shell, an outer shell rotatably mounted thereon, a stump socket attached to said outer shell and rotatable therewith, a wrist member rotatably mounted on said outer shell and adapted to receive a terminal device, means operable to rotate said wrist member relative to said outer shell when the latter is rotated by said stump socket relative to said stationary shell, a locking member mounted on said outer shell for movement into and out of engagement with said wrist member to lock the same against rotation, a control member connected to said terminal device, and an actuating member associated with said control member and movable thereby to shift said locking member into engagement with said wrist member, so as to lock said wrist member while said terminal device is being operated.

9. A below-elbow artificial arm comprising a stationary forearm shell, an outer shell rotatably mounted thereon, a stump socket attached to said outer shell and rotatable therewith, a wrist member rotatably mounted on said outer shell and adapted to receive a terminal device, a pair of flexible lines carried by said outer shell, said lines being connected at one end to said stationary forearm shell and at the other end to said wrist member in a manner whereby rotation of said outer shell with respect to said stationary shell causes a pull to be exerted on one of said lines, and the pull on said one line causes said wrist member to be rotated in the same direction relative to said outer shell, a locking member mounted on said outer shell for movement into and out of engagement with said wrist member to lock the same against rotation, a control member operably connected to said terminal device, and an operating member movably mounted on said outer shell, said operating member being connected to said locking member to move the same into engagement with said wrist member when shifted in one direction, and said operating member being shifted in said one direction responsive to the application of a force on said control member, whereby said wrist is locked while said terminal device is being operated.

10. A below-elbow artificial arm comprising a stationary forearm shell, an outer shell rotatably mounted thereon, a stump socket attached to said outer shell and rotatable therewith, a wrist member rotatably mounted on said outer shell and adapted to receive a terminal device, a pair of flexible lines carried by said outer shell, said lines being connected at one end to said stationary forearm shell and at the other end to said wrist member in a manner whereby rotation of said outer shell with respect to said stationary shell causes a pull to be exerted on one of said lines, and the pull on said one line causes said wrist member to be rotated in the same direction relative to said outer shell, a locking member mounted on said outer shell for movement into and out of engagement with said wrist member to lock the same against rotation, a control cable operably connected to said terminal device, a housing enclosing said cable, and an operating member slidably mounted on said outer shell and connected to said locking member to shift the same into engagement with said wrist member when moved in one direction, said cable housing being attached to said operating member, and the latter being moved in said one direction by the reaction force on said cable housing when a force is applied to the cable so as to lock said wrist when said terminal device is being operated.

11. In a below-elbow artificial arm, the combination of a stationary forearm shell having an outer shell rotatably mounted thereon, a stump socket attached to said outer shell and rotatable therewith, a wrist member rotatably mounted on said outer shell and adapted to receive a terminal device, a pair of flexible lines extending generally lengthwise of said outer shell, a pair of pulleys journaled on said outer shell at the proximal end thereof, and another pair of pulleys journaled on said outer shell at the distal end thereof, the inner ends of said lines passing around said first-named pulleys and extending circumferentially around the arm in opposite directions to points of attachment with said stationary forearm shell, the outer ends of said lines passing around said last-named pulleys and extending in the same directions as their respective inner ends to points of attachment with said wrist member, whereby rotation of said outer shell with respect to said stationary shell causes a pull to be exerted on one of said lines, and the pull of said one line causes said wrist member to be rotated in the same direction relative to said outer shell, a locking member mounted on said outer shell for movement into engagement with said wrist member to lock the same against rotation, a control member operably connected to said terminal device, and an operating member movably mounted on said outer shell, said operating member being connected to said locking member to move the same into engagement with said wrist member when shifted in one direction, and said operating member being shifted in said one direction responsive to the application of a force on said control member, whereby said wrist is locked while said terminal device is being operated.

12. In a below-elbow artificial arm, the combination of a stationary forearm shell having an outer shell rotatably mounted thereon, a stump socket attached to said outer shell and rotatable therewith, a wrist member rotatably mounted on said outer shell and adapted to receive a terminal device, a pair of flexible lines extending generally lengthwise of said outer shell, a pair of pulleys journaled on said outer shell at the proximal end thereof, and another pair of pulleys journaled on said outer shell at the distal end thereof, the inner ends of said lines passing around said first-named pulleys and extending circumferentially around the arm in opposite directions to points of attachment with said stationary forearm shell, the outer ends of said lines passing around said last-named pulleys and extending in the same directions as their respective inner ends to points of attachment with said wrist member, whereby rotation of said outer shell with respect to said stationary shell causes a pull to be exerted on one of said lines, and the pull of said one line causes said wrist member to be rotated in the same direction relative to said outer shell, a locking member mounted on said outer shell for movement into engagement with said wrist member to lock the same against rotation, a control cable operably connected to said terminal device, a housing enclosing said cable, and an operating member slidably mounted on said outer shell and connected to said locking member to shift the same into engagement with said wrist member when moved in one direction, said cable housing being attached to said operating member, and the latter being moved in said one direction by the reaction force on said cable housing when a force is applied to the cable so as to lock said wrist when said terminal device is being operated.

GILBERT M. MOTIS.

References Cited in the file of this patent

UNITED STATES PATENTS

| Number | Name | Date |
| --- | --- | --- |
| 2,408,880 | Rebers | Oct. 8, 1946 |
| 2,457,316 | Northrop et al. | Dec. 28, 1948 |
| 2,493,841 | Threewit | Jan. 10, 1950 |

FOREIGN PATENTS

| Number | Country | Date |
| --- | --- | --- |
| 103,759 | Great Britain | Feb. 8, 1917 |
| 397,703 | Germany | June 27, 1924 |